(12) United States Patent
Nydam et al.

(10) Patent No.: US 11,932,174 B2
(45) Date of Patent: Mar. 19, 2024

(54) FIBER COMPOSITE WITH STITCHED STRUCTURAL IMAGE

(71) Applicant: Ford Global Technologies, LLC, Dearborn, MI (US)

(72) Inventors: Scott Nydam, Farmington Hills, MI (US); Aref Vandadi, Ann Arbor, MI (US); Stavros Melabiotis, Livonia, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 286 days.

(21) Appl. No.: 17/582,429

(22) Filed: Jan. 24, 2022

(65) Prior Publication Data
US 2023/0234519 A1 Jul. 27, 2023

(51) Int. Cl.
*B60R 13/00* (2006.01)
*B29C 70/08* (2006.01)
*B62D 25/08* (2006.01)
*B62D 25/10* (2006.01)
*D05B 93/00* (2006.01)

(52) U.S. Cl.
CPC ............ *B60R 13/005* (2013.01); *B29C 70/08* (2013.01); *B62D 25/082* (2013.01); *B62D 25/10* (2013.01); *D05B 93/00* (2013.01); *D10B 2101/12* (2013.01); *D10B 2505/12* (2013.01)

(58) Field of Classification Search
CPC .............................. B29C 70/38; B60R 13/005
See application file for complete search history.

(56) References Cited

U.S. PATENT DOCUMENTS

| 8,771,445 B2 | 7/2014 | Joern et al. |
| 2004/0074589 A1* | 4/2004 | Gessler ................. B29C 70/202 156/247 |
| 2006/0068150 A1 | 3/2006 | Henrich et al. |
| 2019/0387831 A1 | 12/2019 | Dua et al. |

FOREIGN PATENT DOCUMENTS

| DE | 102009041177 A1 * | 3/2011 |
| WO | WO-2007/010050 A1 * | 1/2007 |
| WO | WO-2020/183475 A1 * | 9/2020 |

* cited by examiner

*Primary Examiner* — Jeffry H Aftergut
(74) *Attorney, Agent, or Firm* — Burris Law, PLLC

(57) ABSTRACT

A plurality of structural fibers are laid onto a substrate. The plurality of structural fibers are stitched together with a thread in a specified stitching pattern to form a composite preform. The thread in the specified stitching pattern secures the structural fibers to each other such that the structural fibers provide a tailored load path within the composite preform and presents a visible image on an outer surface of the composite preform.

20 Claims, 8 Drawing Sheets

FIBER COMPOSITE WITH STITCHED STRUCTURAL IMAGE

FIELD

The present disclosure relates to composite materials and methods of manufacturing composite materials with stitching.

BACKGROUND

The statements in this section merely provide background information related to the present disclosure and may not constitute prior art.

Composite materials for vehicle components provides advantages to tailor structural properties for specific use/load conditions. Various composite manufacturing processes can produce parts that address size constraints, load absorption, and manufacturing waste concerns. For example, fibers in a composite preform can be oriented to absorb and distribute loads according to directions in which loads are expected to occur in operation. However, customization of vehicle components using these composite materials is challenging due to the presence of individual fibers extending in a variety of directions, which are further embedded in another separate matrix material.

The present disclosure addresses challenges related to customization of parts manufactured with composite materials.

SUMMARY

This section provides a general summary of the disclosure and is not a comprehensive disclosure of its full scope or all of its features.

In one form, a method of manufacturing a composite preform includes laying a plurality of structural fibers onto a substrate. and stitching the plurality of structural fibers together with a thread in a specified stitching pattern. The thread in the specified stitching pattern (1) secures the structural fibers to each other such that the structural fibers provide a tailored load path within the composite preform and (2) presents a visible image on an outer surface of the composite preform.

In variations of the above method, which may be implemented individually or in any combination: the visible image is at least one of a geometric pattern, a colored pattern, text, and a graphic; the plurality of structural fibers are laid in a plurality of layers, the thread in the specified stitching pattern presenting the visible image proximate an outermost layer of the plurality of layers; a resin is impregnated within the composite preform and the thread and the resin is subsequently cured; the visible image is visible through the cured resin; the composite preform is formed into a vehicle component; the visible image is visible on a class-A surface of the vehicle component; the stitching pattern includes a structural load path and an image pattern, the thread is stitched according to the structural load path to secure the structural fibers to each other and, then, the thread is stitched according to the image pattern to present the visible image; the stitching pattern includes a plurality of stitching locations arranged in a specified order, and the thread is threaded through each of the stitching locations according to the specified order; the stitching locations are arranged to secure the structural fibers to each other and to present the visible image when the thread is threaded through each of the stitching locations in the specified order; the structural fibers comprise a carbon material; the thread is one of polyester and glass; the thread is luminescent; the structural fibers are stitched to a substrate with the thread.

In another form, a composite component includes a plurality of structural fibers arranged on a substrate, at least one thread securing the plurality of structural fibers to the substrate, and a polymer matrix impregnating the structural fibers. The thread is arranged to present a visible image visible through the polymer matrix.

In variations of the composite component, which may be implemented individually or in combination: the visible image is at least one of a repeating geometric pattern, a colored pattern, text, or a graphic; the thread is arranged according to a stitching pattern and the thread in the stitching pattern (1) secures the structural fibers to each other and (2) presents the visible image on an outer surface of the composite preform; the stitching pattern includes a plurality of stitching locations arranged in a specified order and the thread is threaded according to the specified order to present the visible image; the structural fibers comprise a carbon material; the visible image is visible on a class-A surface of a vehicle component formed from the composite preform.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
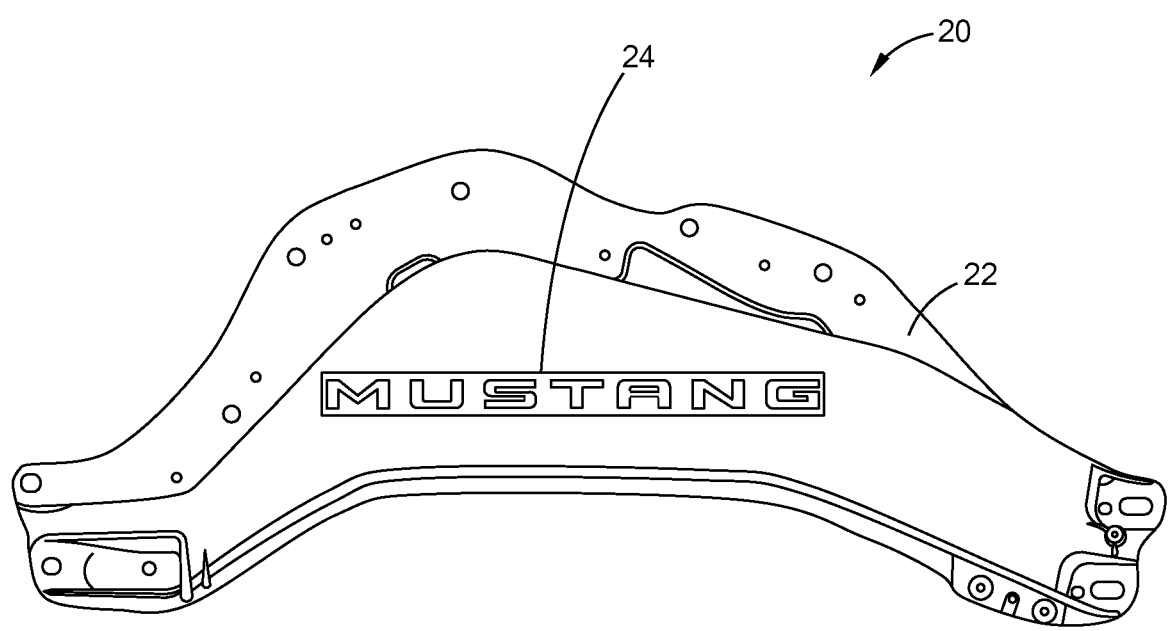
FIG. 1 is a perspective view of a vehicle component formed of a composite preform according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a vehicle component 20 is formed from a composite preform. The vehicle component 20 has an outer surface 22 visible to users of a vehicle, i.e., a "class-A" surface 22. The exemplary vehicle component 20 in the form of FIG. 1 is a brace for an engine of the vehicle, and the vehicle component 20 may be any suitable component that can be formed from the composite preform, such as by way of example, an engine hood or a door trim, among others. The vehicle component 20 includes a visible image 24, such as text or a graphic, that is visible on the class-A surface 22 to the users. The visible image 24 presents information and/or aesthetic images to the users, such as a logo or identifying information about the vehicle.

The vehicle component 20 is formed of a composite material selected and designed for specified part/component structural properties. In one form, the composite material includes carbon fibers, generally within a polymer matrix, that absorb and direct loads applied to the vehicle component 20. In another form, the composite material includes a transparent polymer forming a smooth surface exposing the visible image 24. In another form, the composite material is chosen with specific load absorption and elastic deformation properties. Whatever the structural design requirements that are being met by the composite material, the teachings of the present disclosure provide both a structural part/component and a visible image 24 that is aesthetically presented to the observers of the vehicle. As such, the innovative teachings herein provide for a dual-function composite part that meets structural load requirements while also presenting an intentional visible image 24.

Figure 2:
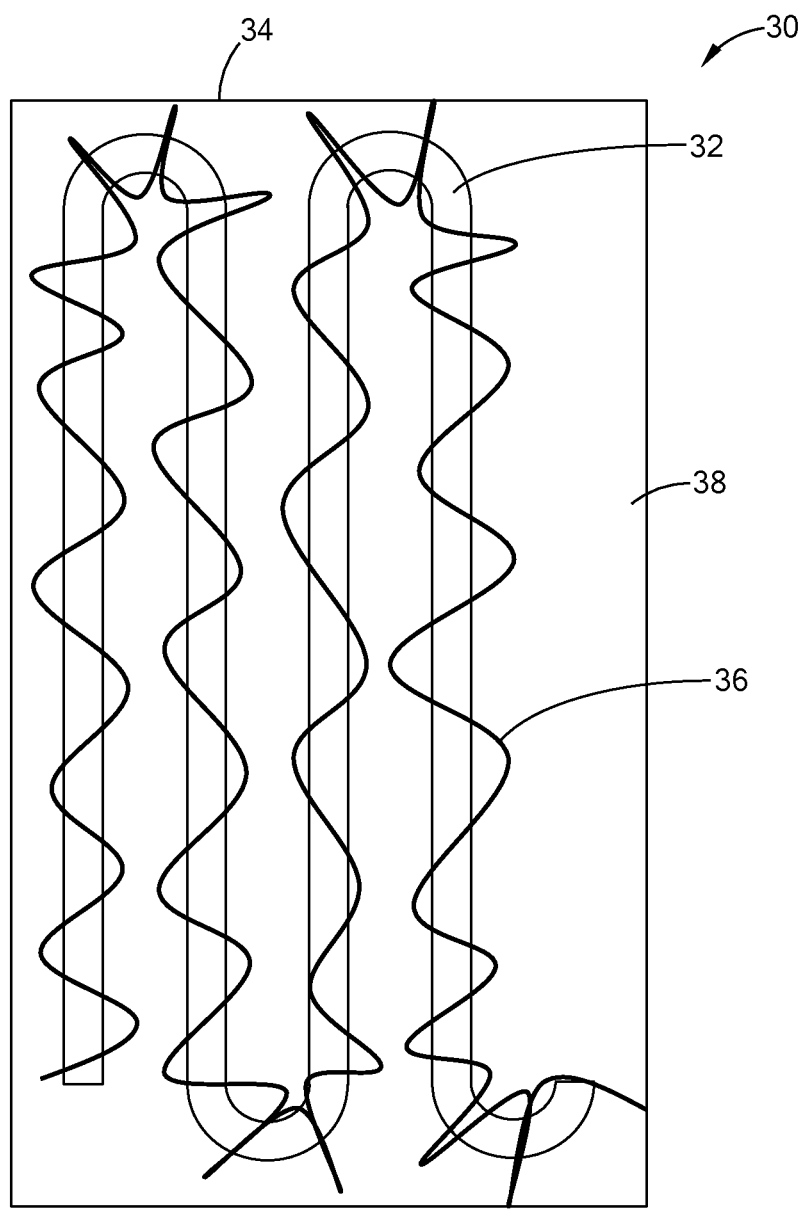
FIG. 2 is a magnified view of a plurality of fibers stitched with a thread according to the present disclosure.

FIG. 2 shows a composite preform 30 from which the vehicle component 20 is formed. The composite preform 30 that forms the vehicle component 20 is manufactured in a fiber placement process. It should be understood, however, that other fiber processes, such as filament winding by way of example, may also be used to form the composite preform 30. According to one method of the present disclosure, as described in greater below, layers of structural fibers 32 are placed on a substrate 34, a thread 36 stitches the structural fibers to the substrate 34, and a polymer resin is subsequently impregnated into the layers of structural fibers 32. After the thread 36 is stitched to the structural fibers to form the composite preform 30, the resin may be infused or injected, by way of example using a resin transfer molding (RTM) process, where the composite preform 30 is placed into a mold or die having the final shape of the component. In another form, the fibers may be preimpregnated with resin, located with the fiber placement (or other) process, and then stitched together to form the composite preform 30. This composite preform 30 is then placed into a mold or die and compression molded. These and other variations of forming a composite preform 30, including hand lay-up of preimpregnated plies of composite material, whether unidirectional and/or woven, should be construed as falling within the scope of the present disclosure.

In one variation, the fibers (or preimpregnated fibers) are laid to a specified thickness throughout the composite preform 30, allowing local variations in thickness throughout the component 20 to tailor the load path, or load carrying capability of the component 20. When the polymer resin cures into a matrix 38, the structural fibers 32 are secured within the cured matrix 38. The thread 36 secures the structural fibers 32 to the substrate 34 until the matrix 38 cures.

In the form shown in FIG. 2, the fibers 32 are a bundle of carbon fibers laid onto the substrate 34 and then stitched to the substrate 34 with the thread 36. The bundle of fibers 32 in some manufacturing processes is referred to as "tow" or "tow fiber." It should be understood that carbon fibers are merely exemplary, and other types of fiber material, such as by way of example glass, Kevlar®, and boron, among others may be employed while remaining within the scope of the present disclosure. In another form not shown in the figures, the structural fiber 32 is a single fiber (rather than a bundle or tow) laid on the substrate 34. The fibers 32 provide a tailored load path within the composite preform 30, absorbing and distributing loads applied to the component 20 during use. The substrate 34 is a support material to which the thread 36 holds the fibers 32 until the matrix 38 cures. In one form, the fibers 32 are arranged in an S-shaped pattern as shown, elongated up along the substrate 34, then turned to extend down along the substrate 34, and continually laid in such a serpentine manner. The fibers 32 are arranged into one or more layers, and one layer of fibers 32 is placed on a previously placed layer of fibers 32 until a specified thickness across the composite preform 30 is reached. In one form, the fibers 32 are laid into four layers, each layer of fibers 32 being secured to the substrate 34 with the thread 36. The thread 36 of FIG. 2 is continuous, and it is within the scope of this disclosure that the thread 36 includes a plurality of discontinuous threads that, when connected, secure the fibers 32 to the substrate 34.

As set forth above, the thread 36 secures the structural fibers 32 to the substrate 34. In the form of FIG. 2, the thread 36 is attached to the substrate 34 in a non-ordered arrangement such that the thread 36 secures the fibers 32 to the substrate 34 but does not create an intentionally aesthetic pattern. As such, the composite preform 30 formed with the fiber 32 and thread 36 of FIG. 2 may be used for a component 20 that lacks a class-A surface 22 visible to users of the vehicle. As used herein, the thread 36 is a flexible material, such as polyester or glass but may also be other materials as specific applications permit.

Figure 3:
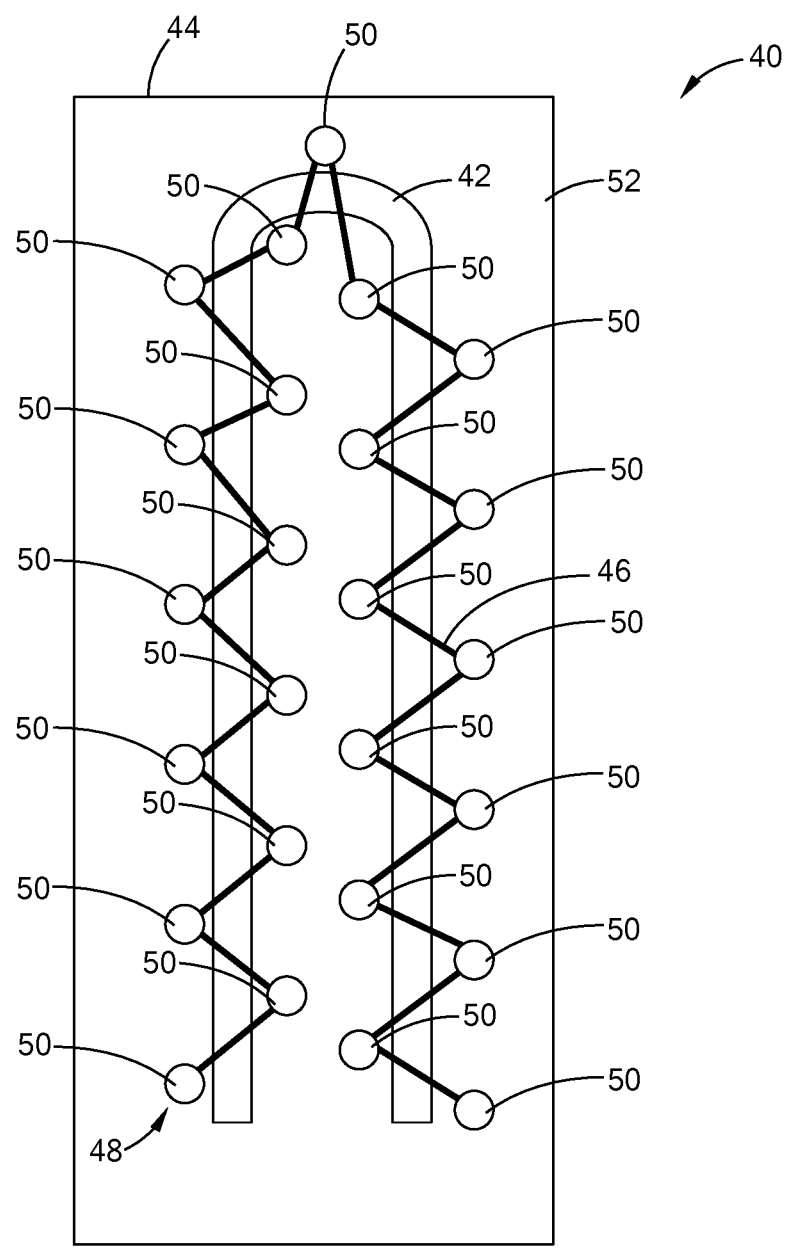
FIG. 3 is a magnified view of the thread stitched according to a specified pattern according to the present disclosure.

Referring to FIG. 3, a composite preform 40 having a plurality of structural fibers 42 stitched to a substrate 44 with a thread 46 in a specified stitching pattern 48 is shown. The thread 46 in the stitching pattern 48 secures the structural fibers 42 to each other and presents a visible image 24 (FIG. 1) on an outer surface of the composite preform. The visible image 24 is visible on a class-A surface 22 of a component 20 formed with the composite preform 40. The plurality of structural fibers 42 are laid in a plurality of layers, as described above, and the thread 46 in the specified stitching pattern 48 presents the visible image 24 proximate an outermost layer of the plurality of layers. In the form of FIG. 3, the thread 46 forms the visible image 24, and it is within the scope of this disclosure that the structural fibers 42 may contribute to the visible image 24, such as with colored fibers 42 and/or arrangement and alignment of the fibers 42 to form a pattern.

The stitching pattern 48 includes a plurality of stitching locations 50 arranged in a specified order to form the visible image 24. The stitching locations 50 are determined based on, e.g., a model of the visible image 24 algorithmically discretized into a plurality of points that, when threaded by the thread 46 in the specified order, form the visible image 24. A stitching device, such as a motorized needle controlled by a computer, secures the thread 46 to a first of the stitching locations 50, then to a second of the stitching locations 50, and then sequentially to each of the stitching locations 50 in the specified order. In one form, each stitching location 50 is assigned a pair of two-dimensional Cartesian coordinate points and the stitching device is movable within a two-dimensional Cartesian plane to the coordinate points assigned to the stitching location 50, the coordinate points stored in a memory of the computer controlling the stitching device. The coordinate points are provided to the computer in a suitable format, such as a CAD model. Then, the stitching device secures the thread 46 to the substrate 44 and moves to a successive stitching location 50. Upon stitching the thread 46 to the final stitching location 50 of the plurality of stitching locations 50, the thread 46 forms the visible image 24. The stitching locations 50 are arranged in the stitching pattern 48 to secure the structural fibers 42 to each other and to present the visible image 24 when the thread 46 is threaded through each of the stitching locations 50 in the specified order.

In one form, the stitching pattern 48 includes a structural load path and an image pattern. The structural load path includes a plurality of stitching locations 50 that, when the thread 46 is threaded therethrough, secure the structural fibers 42 to the substrate such that the structural fibers 42 direct loads along a specified direction, improving absorption of loads applied to the vehicle component 20. The image pattern includes a plurality of stitching locations 50 that, when the thread 46 is threaded therethrough, form the visible image 24 but in another form may not secure the structural fibers 42 to each other. The stitching device stitches the thread 46 according to the structural load path to secure the structural fibers 42 and, then, stitches the thread 46 according to the image pattern to present the visible image 24. Alternatively, in another form, the stitching locations of the stitching pattern 48 both secure the structural fibers 42 and form the visible image 24 in a single continuous thread through the stitching locations 50.

Upon stitching the thread 46 according to the predetermined stitching pattern 48, a polymer resin is applied to, or impregnated with, the structural fibers 42 and the thread 46, as described above. In one form, the polymer resin cures into a transparent or translucent matrix 52, and the visible image 24 is made visible through the transparent or translucent matrix 52. Thus, when the composite preform 40 is formed into the vehicle component 20, the visible image 24 is visible through the matrix 52 to a class-A surface 22. The polymer resin is a suitable resin that cures into a transparent or translucent matrix 52, such as an epoxy.

Figure 4:
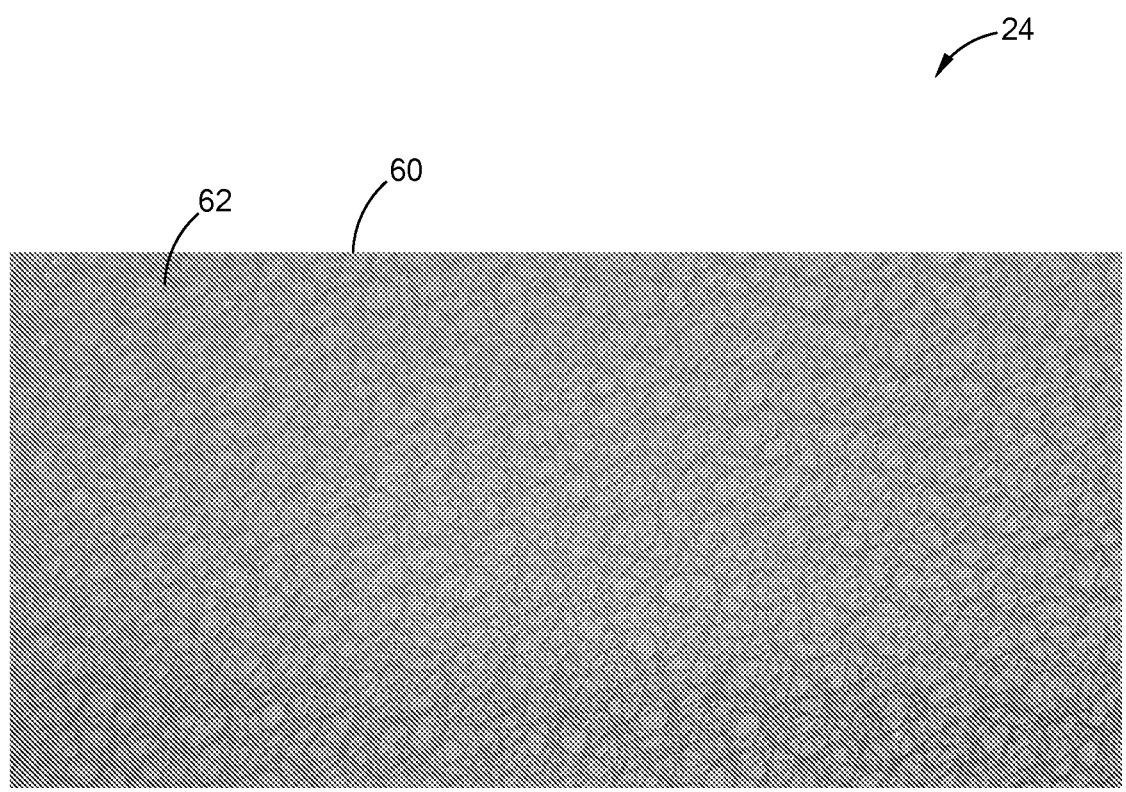
FIG. 4 is an image of a portion of a composite preform with the thread presenting a textured image according to the present disclosure.

The visible image 24 is at least one of a geometric pattern, a colored pattern, text, or a graphic. In a form shown in FIG. 4, the visible image 24 of a composite preform 60 is a geometric pattern 62. The geometric pattern 62 is a textured pattern resembling forged carbon fiber sheet molds, and the geometric pattern 62 can be any suitable pattern. As such, the component 20 aesthetically resembles materials such as forged carbon while maintaining material characteristics of the composite material.

The stitching pattern 48 to form the geometric pattern 62 is determined with a suitable method, e.g., by algorithmically discretizing a desired shape or pattern into a plurality of points that, when connected, form the geometric pattern 62. The stitching pattern 48 to form the geometric pattern 62 can, as described above, both secure the fibers of the composite preform 60 to each other and form the visible image 24 in a single stitching process. The geometric pattern 62 is visible through the outer transparent surface of the composite preform 60 without protruding through the outer surface.

Figure 5:
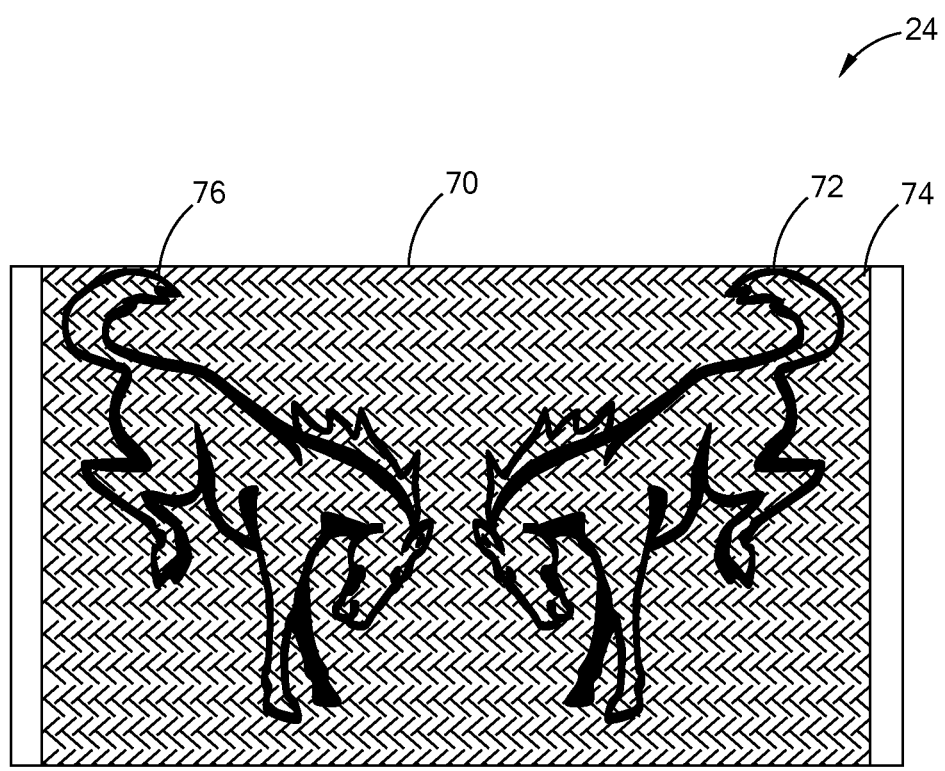
FIG. 5 is another composite preform with the thread presenting a graphic image according to the present disclosure.

In a form shown in FIG. 5, the visible image 24 of a composite preform 70 is a graphic 72. The graphic 72 is a drawing or picture that is visible on the class-A surface 22 of the component 20. The graphic 72 can be a specific drawing, such as a logo, stitched into the composite preform 70. The graphic 72 is visible through the outer transparent surface of the composite preform 80 without protruding through the outer surface.

The stitching pattern 48 to form the graphic 72 is determined with a suitable method, e.g., by algorithmically discretizing the graphic 72 into a plurality of points that, when connected, form the graphic 72. The stitching pattern 48 to form the graphic 72 includes a structural load path 74 that secures the fibers of the composite preform 70 to each other and an image pattern 76 that is stitched onto the secured fibers to form the graphic 72.

Figure 6:
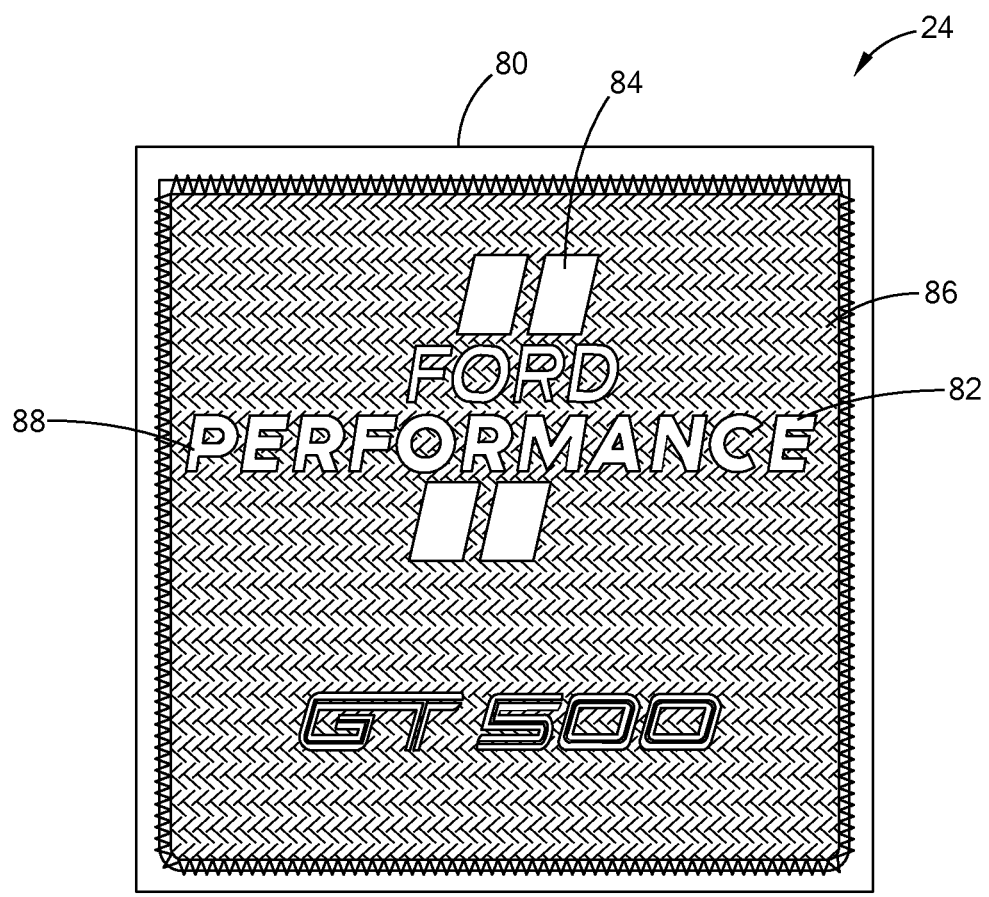
FIG. 6 is another composite preform with the thread presenting another graphic image, including text, according to the present disclosure.

In a form shown in FIG. 6, the visible image 24 of a composite preform 80 includes text 82. The text 82 can include alphanumeric characters, punctuation, and other characters. The text 82 can include information about the vehicle to which the vehicle component 20 is installed, such as a make, a model, a trim level, a serial number, or other identifying information. The text 82 is visible through the outer transparent surface of the composite preform 80 without protruding through the outer surface.

The stitching pattern 48 to form the text 82 is determined with a suitable method, e.g., by algorithmically discretizing the text 82 into a plurality of points that, when connected, form the text 82. The visible image 24 can include text 82 and one or more graphics 84, such as the logo shown in FIG. 6. The stitching pattern 48 to form the text 82 and the graphic 84 includes a structural load path 86 that secures the fibers of the composite preform 80 to each other and an image pattern 88 that is stitched onto the secured fibers to form the text 82 and the graphic 84.

Figure 7:
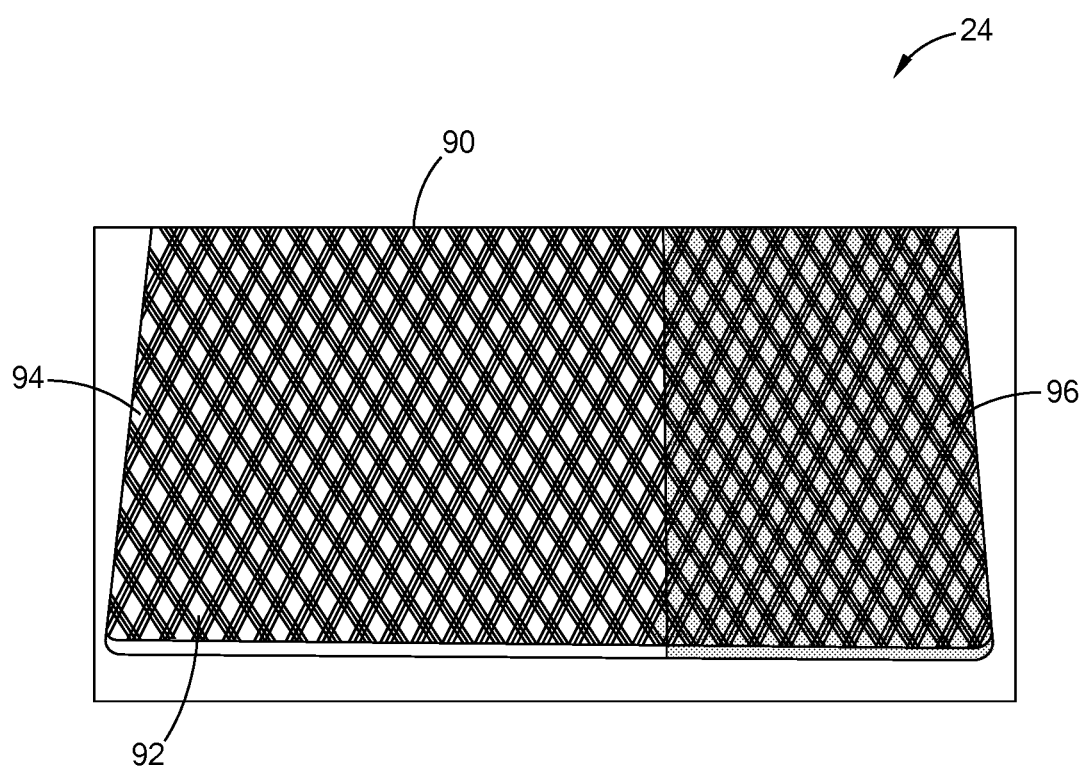
FIG. 7 is another composite preform with the thread presenting a colored layer according to the present disclosure.

In a form shown in FIG. 7, the visible image 24 of a composite preform 90 is a colored pattern 92. The structural fibers are difficult to dye into specific colors, and to provide color to the outer surface of the composite preform 90, the thread is dyed to a specific color. The stitching pattern 48 is determined such that the dyed thread is visible as a substantially continuous layer. The visible image 24 can include a plurality of colored threads, each dyed to form different colors for the colored pattern 92. FIG. 7 shows two colors of threads, a first colored thread 94 and a second colored thread 96, represented as two different shaded patterns in the figures. An amount of each of the colored threads 94, 96 on a specific area of the surface of the composite preform 90 determines a final color that is displayed in the visible image 24 in that area. For example, different amounts of a blue thread 94 and a purple thread 96 form specific shades of the colored pattern 92 between a fully blue pattern and a fully purple pattern. Thus, different shades of colors can be formed in the colored pattern 92 with different amounts of the colored threads 94, 96.

The stitching pattern 48 to form the colored pattern 92 is determined with a suitable method, e.g., by selecting stitching locations 50 such that the colored threads 94, 96 cover a specified portion of the outermost layer of structural fibers. The stitching pattern 48 to form the colored pattern 92 both secure the fibers of the composite preform 90 to each other and form visible image 24 in a single stitching process.

In another form, at least one of the colored threads 94, 96 is luminescent. A "luminescent" thread emits light in a manner such as fluorescence or electroluminescence. A fluorescent thread absorbs light from an external light source (such as the sun) and fluoresces visible light. An electroluminescent thread converts electricity from a power source (such as a battery) to emitted visible light. When the visible image 24 is formed of a luminescent thread 94, 96, the visible image 24 illuminates, presenting the visible image 24 to users of the vehicle in dimly lit or unlit environments.

Figure 8:
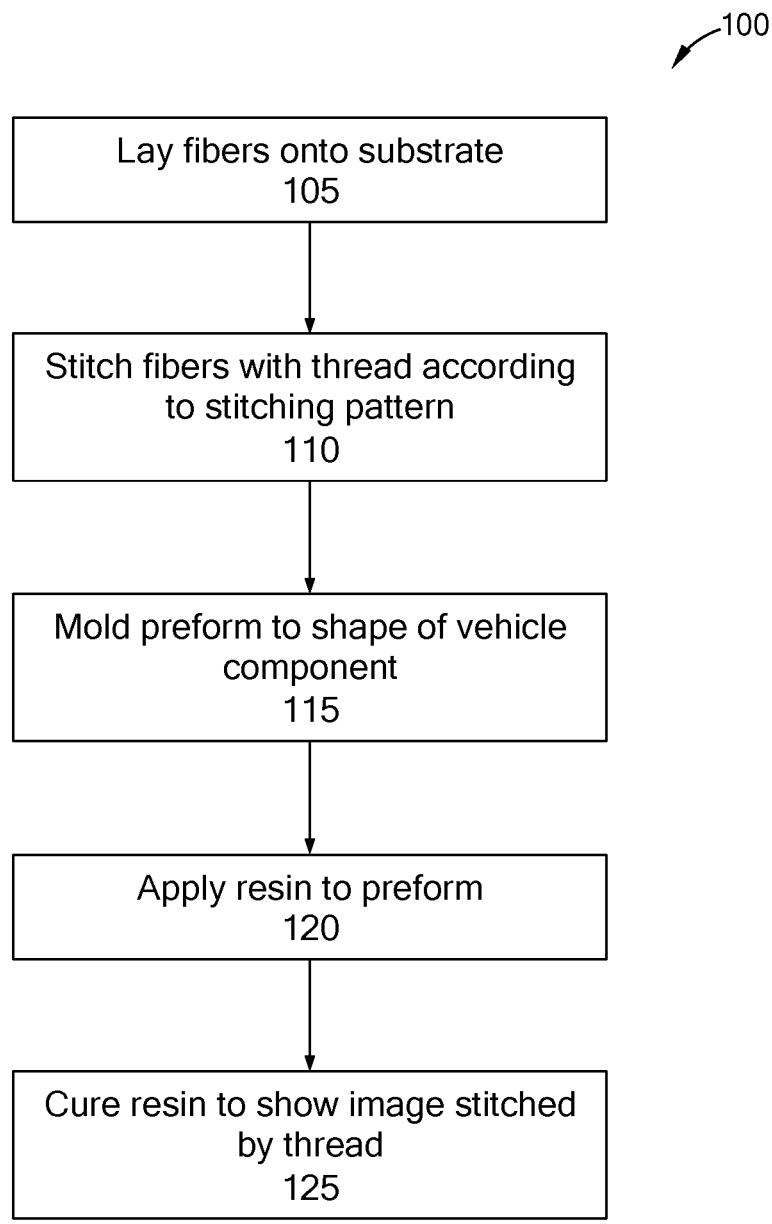
FIG. 8 is a block diagram of an example process for forming a composite preform according to the present disclosure.

FIG. 8 is a block diagram of an example process 100 for manufacturing a vehicle component 20 with a composite preform 40. The process 100 begins in a block 105, in which structural fibers 42 are laid onto a substrate 44. As described above, the structural fibers 42 are laid in a serpentine manner into one or more layers.

Next, in a block 110, the structural fibers 42 are stitched to the substrate 44 with a thread 46 according to a specified stitching pattern 48. The stitching pattern 48 includes a plurality of stitching locations 50 that, when connected by the thread 46, secure the structural fibers 42 to each other and present a visible image 24. Upon stitching the structural fibers 42 to the substrate 44, the composite preform 40 is formed.

Next, in a block 115, the composite preform 40 is molded to a shape of the vehicle component 20. In one form, the vehicle component 20 is an engine brace, and the composite preform 40 is molded to the shape of the engine brace. The composite preform 40 is molded such that the visible image 24 is visible on a class-A surface of the vehicle component.

Next, in a block 120, a resin is applied to the preform 40. The resin is a polymer that permeates through the structural fibers 42. In another form, the structural fibers 42 are already impregnated with resin, and block 120 is omitted from the process 100.

Next, in a block 125, the resin is cured into a transparent or translucent matrix 52. Upon curing, the visible image 24 is made visible through the matrix 52 to a class-A surface of the component 20. The matrix 52 secures the structural fibers 42, the substrate 44, and the thread 46 in place, and manufacturing of the component 20 is complete. Following the block 125, the process 100 ends.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of manufacturing a composite preform, the method comprising:
   laying a plurality of structural fibers onto a substrate; and
   stitching the plurality of structural fibers together with a thread in a specified stitching pattern,
   wherein the thread in the specified stitching pattern (1) secures the structural fibers to each other such that the structural fibers provide a tailored load path within the composite preform and (2) presents a visible image on an outer surface of the composite preform.

2. The method of claim 1, wherein the visible image is at least one of a geometric pattern, a colored pattern, text, and a graphic.

3. The method of claim 1, further comprising laying the plurality of structural fibers in a plurality of layers, wherein the thread in the specified stitching pattern presents the visible image proximate an outermost layer of the plurality of layers.

4. The method of claim 1, further comprising impregnating a resin within the composite preform and the thread and subsequently curing the resin.

5. The method of claim 4, wherein the visible image is visible through the cured resin.

6. The method of claim 1, further comprising forming the composite preform into a vehicle component.

7. The method of claim 6, wherein the visible image is visible on a class-A surface of the vehicle component.

8. The method of claim 1, wherein the stitching pattern includes a structural load path and an image pattern, the method further comprising stitching the thread according to the structural load path to secure the structural fibers to each other and, then, stitching the thread according to the image pattern to present the visible image.

9. The method of claim 1, wherein the stitching pattern includes a plurality of stitching locations arranged in a specified order, and the method further comprises threading the thread through each of the stitching locations according to the specified order.

10. The method of claim 9, wherein the stitching locations are arranged to secure the structural fibers to each other and to present the visible image when the thread is threaded through each of the stitching locations in the specified order.

11. The method of claim 1, wherein the structural fibers comprise a carbon material.

12. The method of claim 1, wherein the thread is one of polyester and glass.

13. The method of claim 1, wherein the thread is luminescent.

14. The method of claim 1, further comprising stitching the structural fibers to a substrate with the thread.

15. A composite component, comprising:
    a plurality of structural fibers arranged on a substrate;
    at least one thread securing the plurality of structural fibers to the substrate; and
    a polymer matrix impregnating the structural fibers,
    wherein the thread is arranged to present a visible image visible through the polymer matrix.

16. The composite component of claim 15, wherein the visible image is at least one of a repeating geometric pattern, a colored pattern, text, or a graphic.

17. The composite component of claim 15, wherein the thread is arranged according to a stitching pattern and the thread in the stitching pattern (1) secures the structural fibers to each other and (2) presents the visible image on an outer surface of the composite component.

18. The composite component of claim 17, wherein the stitching pattern includes a plurality of stitching locations arranged in a specified order and the thread is threaded according to the specified order to present the visible image.

19. The composite component of claim 15, wherein the structural fibers comprise a carbon material.

20. The composite component of claim 15, wherein the visible image is visible on a class-A surface of the composite component.

\* \* \* \* \*